Feb. 16, 1971   R. POWELL ET AL   3,563,652

HOLOGRAPHIC METHOD OF PHOTOELASTIC STRESS ANALYSIS

Filed Feb. 13, 1967

INVENTORS
ROBERT POWELL
JOSEPH DER HOVANESIAN

BY Hauke, Krass, & Gifford
ATTORNEYS

3,563,652
HOLOGRAPHIC METHOD OF PHOTOELASTIC STRESS ANALYSIS
Robert Powell, Ann Arbor, and Joseph Der Hovanesian, Farmington, Mich., assignors, by mesne assignments, to GCOptronics, Inc., Ann Arbor, Mich., a corporation of Delaware
Filed Feb. 13, 1967, Ser. No. 615,809
Int. Cl. G01b 11/16
U.S. Cl. 356—32           6 Claims

ABSTRACT OF THE DISCLOSURE

To determine the pattern of stress (or strain) distribution in a member under stress a transparent model of a member is formed and a first exposure hologram or photographic record of the interference pattern between coherent light passed through the model and light directly from the coherent source is made. The model is then stressed and a second exposure is recorded on the same hologram. After developing, the hologram is appropriately illuminated to provide a visual reconstruction of the object with fringe lines visible which constitute the interference pattern between the light rays emanating from the object during the two exposures. These fringes may also be viewed as the interference pattern between the light which reconstructs the images of the object as seen during the two exposures. These fringe patterns contain information relating to both the locus of lines wherein the difference between the principal stress is constant and the locus of lines wherein the sum of the principal stress is constant.

BACKGROUND OF THE INVENTION

(I) Field of the invention

This invention pertains to photoelastic methods for determining the stress distribution which results in a solid body when it is put in a state of stress and more particularly to a method for obtaining the loci of points wherein the sum and difference of stresses along two normal coordinates are equal to a constant by techniques involving the formation of a transparent model of the body and the passage of light through the body.

(II) Description of the prior art

A general method for determining the quantitative distribution of an applied stress through a solid body is to form a transparent plane model of the body and use optical methods to analyze the light passing through the body while it is both in a stressed and unstressed condition. Various optical methods of analysis provide the isochromatic lines, that is the loci of points in which the difference between the stresses resulting along two normal axes are equal. A number of relatively simple techniques for developing such isochromic lines are available. In order to arrive at individual stress values it is necessary to determine the isopachic families, or loci of points at which the sum of the two principal stresses are constant, and to combine the information of the isopachic lines and the isochromic lines to obtain separate values of the two principal stresses at each point in the model.

Presently available techniques for developing the isopachic families are relatively limited and present more practical difficulty. One such technique, the one that most closely resembles that of the present invention, involves the disposition of the transparent model in one of the two arms of an interferometer. Interference measurements with the model loaded and unloaded are then compared and plotted for a number of points to develop the isopachic families. Such technique requires the extremely precise experimental practice and controlled conditions which are associated with interferometer measurements, such as use of a flat polished model. The interferometric technique of mapping the isopachic families is also limited to use on models having plane surfaces and using materials which exhibit a fair degree of birefringence.

SUMMARY OF THE PRESENT INVENTION

In contrast thereto, the present invention provides a method of mapping both the isopachic and isochromatic lines which result when a solid member is stressed, in a relatively simple manner which utilizes much less precise experimental technique and yet results in equally rigorous results. The invention broadly resides in the method of forming a hologram of a solid body with a double exposure being made of the body under two conditions of different load (one of which may be no load) and then reconstructing an image of the body. Isopachic and isochromatic lines representing the interference pattern generated by the light during the two exposures will then be visible on the reconstruction.

The hologram consists of a photographic record of the interference pattern between coherent light arriving directly at the photographic surface from a coherent light source, and light from the source which is either passed through or reflected off of the surface of the body under study.

The specific technique used is to first make a hologram of the model under zero or initial load conditions. The light source is then extinguished and without modifying the physical setup in any other way the load upon the model is changed. The coherent light source is then activated to form a second superimposed hologram of a model under loading conditions on the photographic plate, in the manner of a double exposure. After the plate is developed an image of the body may be reconstructed by illuminating the hologram in a conventional manner. The body exhibits two series of contour lines which have proven in practice to represent isopachic and isochromatic interference families.

An alternative method of practice of the present invention involves the formation of a hologram involving only a single exposure during one condition of loading. After development, this hologram may be appropriately illuminated to create an image of the model and this image may be superimposed on the model under a second stage of loading. The stress lines will be made visible in an identical manner as when the double exposure technique is employed.

The calibration constants for the isopachic and isochromatic lines may be obtained by repeating the process with a calibration model. Alternatively, a hologram of both the calibration model and the loaded model may be obtained simultaneously.

In practice, this technique is much simpler and utilizes much more relaxed experimental technique than does the previously used interferometer method of developing isopachic families. While the interferometric method is limited to the determination of stresses on a plane thickness of the model no such limitation exists with the present technique. The isopachic and isochromatic lines seen on the reconstructed image of the model represent the interference between light emanating from the same point, during the two exposures, and the position of that point with respect to other points in the model is immaterial. In the interferometric technique interference lines are developed between the light passed through an unobstructed path and through the model. Thus, in order to obtain any rational measurements, the surfaces of the model must be planar.

Other objects, advantages and applications of the present invention will be made apparent by the following detailed description of a preferred embodiment of the invention. The description makes reference to the accompanying drawings in which.

Figures 1A, 1B, 2, 3:
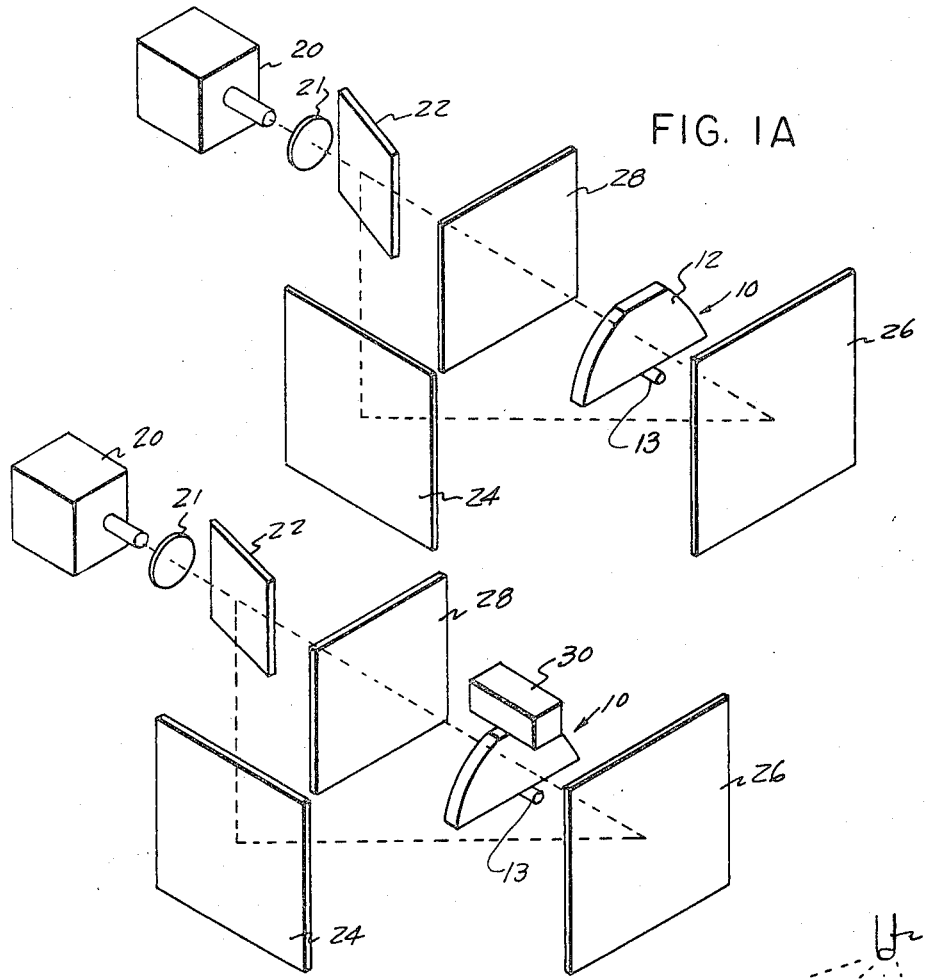
FIG. 1A is a diagram illustrating the method of forming the first exposure on a hologram using an unloaded transparent model of a solid body.
FIG. 1B is a diagram of the model under load used to make a second exposure on the hologram.
FIG. 2 is a diagram illustrating the manner of reconstruction of the developed hologram and the fringes representing isopachic and isochromatic lines which are visible on the image of the model.
FIG. 3 is a perspective view of the second method of practicing the present invention.

A first embodiment of the invention, as illustrated in FIGS. 1A, 1B and 2 utilizes a test specimen, generally indicated at 10, which is formed of a transparent solid material, such as an acrylic plastic. The optical properties of the material other than transparency are not of particular importance to the practice of the method. The specimen 10 may either be a member in which the stress pattern under a particular loading is to be determined, or a model of such member.

The configuration of the specimen 10 illustrated in the drawings is not of importance to the present invention. It constitutes a prism having a pair of vertical planar sides 12, a flat base 14 formed normally to the sides, a rectangular flat top 16 and a pair of curvilinear surfaces 18 which extend normally to the sides 12 and join the base 14 to the top 16. The method of the present invention is applied to the specimen 10 as part of a test series to ultimately determine the stress imposed at any "point" in the model by a loading applied between the top 16 and the base 14. Specifically, the method of the present invention will develop the isopachic and isochromatic families which result when the model is so loaded.

The specimen 10 may be supported on a rod 13 to create a localized stress concentration condition.

As a first step in the practice of the method a hologram of the model is made by an arrangement such as that shown in FIG. 1A. The coherent light source 20, employed to prepare the hologram, may constitute a continuous wave laser. Its output light wave is passed through a spreading lens 21 and directed to a beam splitter 22 which provides one portion of the output ray to a mirror 24 which, in turn, reflects the beam, now considerably spread, to a photosensitive plate 26 which may preferably be Kodak 649F emulsion. The other ray from the splitter is passed through a diffusing plate 28 and then through one side 12 of the specimen 10. The rays from the diffusing plate preferably pass through the specimen normally to the surfaces 12. The emanating light from the specimen strikes the same side of the photographic plate 26 as the light from the mirror 24.

This exposure of the film plate is made in accordance with experimental techniques which are well known for the formation of holograms such as rigid stability conditions and the absence of any interfering vibrations.

The photographic plate 26 will record the interference fringes and intensity variations which occur as a result of interference of the "reference" light from the mirror 24 with the subject light passing through the specimen 10.

Following this first exposure, the laser 20 is extinguished and the experiment set-up is untouched except to place a load on the specimen 10 by means of supporting a weight 30 thereon as shown in FIG. 1B. The laser 20 is then again energized, making a "double exposure."

During either of the exposures considered individually, the photographic record recorded on the plate 26 constitutes the interference pattern between the "reference" light and the "specimen" light, and after development of the plate reillumination with the laser positioned with respect to the plate in the same relation as the laser 20 is to the plate 26, a reconstruction of the light waves would occur which would produce an image of the specimen 10 when viewed through the hologram.

Since the specimen 10 appears the same in the loaded or unloaded condition (assuming a sufficient rigidity to avoid any gross deformities as a result of loading) a reconstruction process using the doubly exposed hologram will also provide a virtual image of the specimen 10. This reconstruction is illustrated in FIG. 2. However, the loading by the weight 30 during the second exposure stresses the model internally so as to vary its refraction as a function of the strain at particular points in the model. Accordingly, the light waves emanating from the model during the second exposure are shifted with respect to the waves which emanated from the model during the unloaded condition of the first exposure. Assuming a sufficiently rigid model this light shift will only represent a few wave lengths. During reconstruction the interference between these two light systems will result in fringes 37a and 37b being visible on the reconstructed image.

An experimental analysis of such fringes has shown that the fringe pattern 37a constitutes an isopachic family and the pattern 37b an isochromatic family.

Because the fringes visible during the reconstruction represent lines of interference between light emanating during the two exposures, these fringes may not appear spacially related to the surface of the model but may appear to be floating in space or within the model. In such situations it is necessary to analytically relate the fringes to the surface of a model. The method used depends upon the exact relationship and may start from knowledge of known stress distribution at one or more points in the model.

In order to arrive at a quantitative determination of the stresses in the two planes normal to the light passage through the model, it is first necessary to arrive at numerical values for the isopachic and isochromatic lines. This may be done by subjecting a calibration model, having a known stress distribution under load, to the process illustrated in FIGS. 1A, 1B and 2 or other experimental procedures may be used. A numerical analysis of the intersections of the isochromatics and the isopachics will provide the actual stress at any point in the body as a result of the loading.

An alternative method of practice of the present invention involves making only a single exposure in the manner illustrated in FIG. 1A; illuminating the developed hologram to produce a visual image of the model in this initial state of loading, and superimposing the image on the actual model while it is in a second state of loading. Again, fringe lines identical to those visible in FIG. 2 will appear on the model, or spacially related to the model, and identica analytic procedure may be applied to obtain quantitative stress values baser on these lines.

Another alternative application of the method of the present invention involves the use of a birefringent coating, or layer, bonded to the surface of an object to be stress analyzed. FIG. 3 illustrates the method. The object to be investigated is 32. The birefringent layer (commonly called a photoelastic coating) is 31. In this application the principles are identical to those previously described above, except that in this case the coherent light passes through the birefringent layer twice; first it is transmitted from the outer surface of the coating through its thickness; then it is reflected at the coating-object interface such that it is transmitted through the thickness a second time, thence to impinge upon the photographic plate 24. In this application, isochromatic and isopachic patterns are analyzed and interpreted in terms of principal strain values on the surface of the object to be studied. Furthermore, this application lends itself to the study of irregularly shaped three-dimensional objects as well.

While two specific forms of making a hologram have been described above it should be recognized that the method is capable of use with any method of forming a hologram and using it to reconstruct an image of the object, such as so-called "incoherent" and "white light" techniques.

It is thus seen that the method of the present invention provides a relatively simple and efficient method of obtaining the distribution of isopachic and isochromatic lines on a model under load and allows the use of models of a broader variety than previous methods.

Having thus described our invention, we claim:

1. The method of mapping stress distribution in a transparent member under load, in the form of isopachic and isochromic fringe families, comprising: making a first photographic record, on a photographic plate, of the interference pattern between coherent light from a common source projected along a first reference path which does not intersect the member and a second object path which passes through the member, the two paths coinciding at the photographic plate, with the model in a first condition of load; superimposing on such first photographic record a second photographic record formed of the interference pattern between coherent light projected along the two paths, with all the elements in the same geometric relationship, but with the member under a second condition of loading; developing the photographic plate; and illuminating the resultant hologram with an appropriate light source so as to provide an image of the member containing fringe lines representing the interference patterns between light emanating from the member during the first and second exposures resulting from the variation in the refractive properties of the member due to the change in load, such fringe lines consisting of isochromic and isopachic families.

2. The method of claim 1 wherein first and second photographic records are made of a calibration model simultaneously with the making of the first and second photographic records of the member to quantitatively relate the fringe lines to stress distribution.

3. The method of claim 1 wherein the coherent light source consists of a laser and the laser is energized to make the first and second photographic records, and it is de-energized between such recordings.

4. The method of claim 1 wherein the light is projected through non-planar surfaces of the model.

5. The method of mapping stress distribution in a transparent member under load, in the form of isopachic and isochromic fringe families, comprising: making a photographic record, on a photographic plate, of the interference pattern between light from a common coherent source projected along a first reference path which does not intersect the member and a second object path which passes through the member, the two paths coinciding at the photographic plate, with the model in a first condition of load; developing the photographic plate; illuminating the resultant hologram with an appropriate light source so as to provide a reconstructed image of the member; and superimposing the image of the member on the member in a second condition of load, so as to make visible fringe lines representing the interference patterns between the light emanating from the member and the reconstructed image on the member, such interference patterns resulting from the variation in the refractive properties of the member due to the change in load and consisting of isochromic and isopachic families.

6. The method of claim 5 wherein the light is coherent light from a laser.

References Cited

E. N. Leith, Industrial Research, August 1966, pp. 40 and 43.

H. E. Morrow et al., U.S. Navy Electronics Lab, September 1966, pp. 20–21.

K. A. Haines and B. P. Hildebrand, Applied Optics, vol. 5, #4, April 1966, pp. 595–6.

Ramberg, R.C.A. Review, vol. 27, #4, December 1966, pp. 467 and 498.

L. & J. Upatnicks, Progress in Optics, edited by Wolf, vol. VI, 1967, pp. 40–43.

Powell et al., "Interferometric Vibration Analysis . . ." J.O.S.A., vol. 55, #12, pp. 1593–98, December 1965.

Stoke et al., "Two-Beam Interferometry . . .," Applied Physics Letters, vol. 8, #2, pp. 42–44, January 1966.

Tanner, "Some Applications of Holography . . .," J. Sci. Instru., vol. 43, #2, February 1966, pp. 81–83.

Heflinger et al., "Holographic Interferometry," Journal of Applied Physics, vol. 37, #2, February 1966, pp. 642–649.

Brooks et al., "Interferometry With a Holographically Reconstructed Comparison Beam," Applied Physics Letters, vol. 7, #9, November 1965, pp. 248–9.

RONALD L. WIBERT, Primary Examiner

J. ROTHENBERG, Assistant Examiner

U.S. Cl. X.R.

350—3.5; 73—88